United States Patent Office 3,803,257
Patented Apr. 9, 1974

3,803,257
OLEFIN TREATMENT BY SOLVENT EXTRACTION
William J. Powers III and Anthony Macaluso, Sr., Port Arthur, Tex., assignors to Texaco Inc., New York, N.Y.
No Drawing. Filed June 14, 1973, Ser. No. 370,193
Int. Cl. C07c 7/00
U.S. Cl. 260—677 A    12 Claims

ABSTRACT OF THE DISCLOSURE

Olefins, such as $C_5$ to $C_{30}$ alpha olefins formed by thermal cracking of long chain normal paraffins, are subjected to solvent extraction treatment by contacting the olefins in liquid phase at a temperature of about 50° to about 350° F., preferably, from about 65° to about 275° F., with an alkylene glycol or cycloalkylene glycol such as ethylene glycol, 1,2-cyclohexylene glycol, etc. The thus-treated alpha olefins which are low in conjugated polyenes, i.e., dienes, are highly useful for production of olefin sulfonate detergents having an improved color.

BACKGROUND OF THE INVENTION

Field of the invention

This invention relates to an improved process for the purification of olefins. More particularly, this invention relates to a process in which liquid olefins, such as alpha olefins of $C_5$ to $C_{30}$ carbon chain length are treated by contacting the olefins with an alkylene or cycloalkylene glycol such as propylene glycol or 1,2-cycloheptylene glycol. Such treated olefins are useful for preparing olefins sulfonates of improved color.

Description of the prior art

Thermal cracking of long chain normal paraffins is the most economical method for production of normal alpha olefins. Olefins produced by wax cracking, however, are not as desirable as Ziegler olefins in several potential applications since they contain more impurities than olefins produced by Ziegler oligomerizations of ethylene.

Potentially the largest volume application for alpha olefins is as feedstock for the production of alpha olefin sulfonate (AOS) detergents.

Alpha olefins and especially those derived from the cracking of petroleum hydrocarbon, i.e., cracked wax olefins, not only tend to be straw colored, but in addition contain compounds which, although colorless themselves, form highly colored compounds on reaction with $SO_3$. These intensely colored compounds which are present in the sulfonate product are likely polysulfonated polyenes which possibly are derived by polymerization and subsequent sulfonation.

When commercial alpha olefins are utilized in preparing olefin sulfonates for use in detergent compositions it is necessary to treat the olefin employed prior to sulfonation in order to reduce the color level of the sulfonate product. A variety of processes have been advanced in the art for accomplishing this, however, they all suffer from one or more serious disadvantage. It has been suggested that the olefins be purified by passing them over adsorbents, such as clays, or that they be washed with a variety of solvents. Likewise, treatment of the olefins with sulfuric acid followed by water washing has been employed however, because of the numerous processing steps (i.e., contacting the olefin with the acid, allowing the mixture to settle and removing the acid layer, neutralizing the olefin layer followed by repeated washing and finally drying), because the treatment has often resulted in the isomerization of some of the olefins to internal olefins, and because the olefins react to some extent with the sulfuric acid itself, this process has not proven to be satisfactory in practice.

Acid treatment of the cracked wax olefin feed, according to the process of U.S. 3,492,343, prior to sulfonation, results in the removal of the color precursors, i.e., the conjugated di- and polyenes from the olefin feed stream, and in the production of an AOS product with acceptable color properties. In this process, the olefin feedstock is contacted with aqueous sulfuric acid, the aqueous and organic layers are separated and the latter is contacted with an adsorbent such as fuller's earth. The process, as described, suffers from several disadvantages in commercial operation:

(1) The treating agent, 85 to 87 weight percent sulfuric acid, is highly corrosive to standard metallurgical systems, (2) The acid concentration and contacting and settling times are highly critical, and (3) The process is less effective from the point of final AOS color when operated continuously than when it is operated batchwise.

There is a definite need in the art, therefore, for an efficient process for treating olefins so that they are suitable for the production of detergent grade sulfonates. A principal object of this invention is to provide an efficient treatment process for the removal of color precursors such as conjugated polyenes (i.e., dienes) from olefin streams such as those derived by wax cracking.

BRIEF DESCRIPTION OF THE INVENTION

In the process of this invention olefins having from 5 to 30 carbon atoms and, preferably, alpha olefins of the formula:

$$R—CH=CH_2$$

wherein R is straight chain alkyl of from 3 to 28 inclusive carbon atoms, as exemplified by propyl, butyl, pentyl, hexyl, octyl, decyl, dodecyl, pentadecyl, nonadecyl, eicosyl, hexacosyl, heptacosyl, etc. are subjected to solvent extraction treatment by contacting the olefin in liquid phase with an alkylene or cycloalkylene glycol at a temperature of about 50° to about 350° F. and, preferably, at about 65° to about 275° F. Mixtures of the above-described alpha olefins, such as $C_5$–$C_8$ alpha olefins, $C_6$–$C_{12}$ alpha olefins and $C_{16}$–$C_{19}$ alpha olefins, may be advantageously employed as feed stocks for the olefin purification process of this invention.

It has been found that the process of this invention in which the olefins are purified by contacting them directly with an alkylene or cycloalkylene glycol, possesses a number of significant advantages over other art recognized processes, namely:

(1) Noncorrosive extractants are employed, (2) The process may be conducted over a wide range of operating conditions, (3) Polyenes present in the olefin feed are removed from the process in a stream concentrated in polyene content, and (4) There is no net consumption of the purifying or extracting agent since the extraction agent can be conveniently recovered and recycled to the process.

DETAILED DESCRIPTION OF THE INVENTION

In the process of this invention olefins, such as alpha-olefins are purified by treatment or contact with a selective solvent in which the conjugated dienes in the raw olefin stream dissolve. The resulting solvent layer which forms is separated from the raffinate layer by decantation, centrifugation, or by any other convenient method to yield a purified olefin product of substantially lowered conjugated dienes content. The contacting of the alkylene or cycloalkylene glycol with the olefin feed may be accomplished by admixing the solvent with the olefin in a variety of ways either in batch or on a continuous basis. For example, the solvent may be admixed with the olefin feed in an agitatd, baffled tank equipped with a bottom draw-off to permit removal and separation of the solvent (layer) from the raffinate layer at the conclusion of the mixing cycle. The solvent can be commingled with the olefin in a pipe or turbulent reactor after which the treated mixture is sent to a decanter or some other appropriate device to permit phase separation of the resulting two phases. If desired, the solvent treatment can be carried out in stages. The purification of the olefin stream can also be conducted using a rotating disc contactor or under countercurrent extraction conditions where the olefin stream to be purified is passed in a countercurrent manner through a downward flowing stream of the solvent with the purified olefin stream being withdrawn from the top of the extraction vessel and the solvent phase containing a substantial proportion of the conjugated polyenes derived from the olefin stream dissolved therein being withdrawn from the bottom of the unit.

Any inert alkylene or cycloalkylene glycol solvent can be utilized in this olefin purification process that is capable of dissolving the conjugated polyenes without reacting with the olefin itself. Preferred solvents include those glycols having the formula:

HO—R—OH wherein R is alkylene of from 2 to about 16 carbon atoms, and cycloalkylene glycols of the formula:

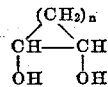

wherein $n$ is an integer of from 2 to about 14. Especially useful alkylene glycol solvents include ethylene glycol, 1,2-propylene glycol, 1,3-propylene glycol, 1,2-butylene glycol, 2,3-butylene glycol, 3,4-pentylene glycol, 1,2-hexylene glycol, 3,4-heptylene glycol, 3,4-hexylene glycol, 3,4-octylene glycol, 1,2-pentylene glycol, 1,2-nonene glycol, etc. and cycloalkylene glycols as exemplified by 1,2-cyclopentene glycol, 1,2-cyclohexene glycol, 1,2-cycloheptene glycol, and 1,2-cyclodecene glycol, etc.

The amount of the inert alkylene or cycloalkylene glycol solvent employed may be varied over a wide range, however, it should be sufficient to dissolve the desired amount of the conjugated polyenes from the olefin stream. The actual amount utilized will depend on the particular solvent selected, the degree of solubility of the conjugated polyene in the solvent, the temperature at which the process is conducted, the efficiency of contacting, etc. Generally, the total amount of solvent employed will be from about 30 to about 250 weight percent based on the weight of the olefins charged. The pressure under which this process is accomplished may likewise be varied from subatmospheric to atmospheric to superatmospheric. Atmospheric pressure operation is preferred. Generally, the pressure employed will be from about 0 to about 100 p.s.i.g. although the pressure used should be sufficient to maintain the olefin stream and the solvent in the liquid state.

The following examples illustrate various embodiments of this invention and are not to be considered as limitative.

EXAMPLES I AND II

In these examples the olefin and propylene glycol solvent were charged to a 2,000 ml. flask equipped with a bottom draw-off following which the charged liquids were stirred briskly for 10 minutes. The solvent (lower) layer was then withdrawn and the solvent for the second stage of the extraction was added, stirred and withdrawn. The third stage of the extraction was similarly performed. In the next step, the raffinate was washed with 100 grams of water and analyzed for conjugated diene content by ultraviolet spectroscopy. The combined extracts were stirred with 400 grams of water to dissolve the solvent and "spring" the conjugated diene concentrate. Pertinent details relating to these examples are set forth in Table I which follows. As shown in Table I in these two examples a high percentage of the conjugated dienes initially present in the olefins charged was removed by the process of this invention. The thus-treated olefin fractions are highly suitable for the preparation of olefin sulfonate detergents of reduced color level.

TABLE I.—SEPARATION OF CONJUGATED DIENES FROM CRACKED WAX OLEFINS BY EXTRACTION WITH PROPYLENE GLYCOL

| Example number | I[a] | II[a] |
|---|---|---|
| Charge wt., grams | 50 | 50 |
| Conjugated diene content, chg. mol. percent | 1.07 | 1.07 |
| Wt. propylene glycol/stage, grams | 100 | 50 |
| Number of stages | 3 | 3 |
| Wt. of raffinate, grams | 44 | 47 |
| Conjugated diene content, raffinate mol. percent | 0.63 | 0.79 |
| Percent conjugated diene removal | 41.1 | 24.4 |
| Wt. of water sprung extracts, grams | 4 | 2 |
| Conjugated diene content, extract, mol percent | 2.5 | 2.7 |
| Wt. percent recovery | 96.0 | 98.0 |

[a] $C_{16}$–$C_{19}$ olefin fraction charged (predominantly alpha olefins), extraction at 250° F.

We claim:

1. A process for treating an alpha olefin having from 5 to 30 carbon atoms to remove conjugated polyenes therefrom which comprises contacting the said olefin in liquid phase with a solvent selected from the group consisting of alkylene and cycloalkylene glycols whereby a liquid olefin phase and a solvent phase having dissolved therein a substantial proportion of the conjugated dienes are formed and separating the olefin phase from the solvent phase.

2. The process of claim 1 wherein the said alkylene glycol has the formula:

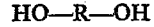

HO—R—OH wherein R is alkylene of from 2 to about 16 carbon atoms and the said cycloalkylene glycol has the formula:

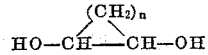

wherein $n$ is an integer of from 2 to about 14.

3. The process of claim 1 wherein the said olefin is a mixture of $C_5$–$C_8$ alpha olefins.

4. The process of claim 1 wherein the said olefin is a mixture of $C_6$–$C_{12}$ alpha olefins.

5. The process of claim 1 wherein the said olefin is a mixture of $C_{16}$–$C_{19}$ alpha olefins.

6. The process of claim 1 wherein the said olefin is contacted with the said solvent at a temperature of about 50° to about 350° F.

7. The process of claim 1 wherein the said solvent is an alkylene glycol.

8. The process of claim 1 wherein the said solvent is propylene glycol.

9. The process of claim 1 wherein the said solvent is 2,3-butylene glycol.

10. The process of claim 1 wherein the said solvent is a cycloalkylene glycol.

11. The process of claim 1 wherein the said solvent is 1,2-cyclohexylene glycol.

12. The method of claim 1 wherein the said olefin is a mixture of $C_{16}$–$C_{19}$ alpha olefins and the said solvent is propylene glycol.

References Cited

UNITED STATES PATENTS

| | | | |
|---|---|---|---|
| 2,925,452 | 2/1960 | Broughton | 260—677 A |
| 2,834,820 | 5/1958 | Bloch | 260—677 |
| 3,094,571 | 6/1963 | Wilson, Jr. et al. | 260—677 A |
| 3,201,492 | 8/1965 | Sherk | 260—681.5 R |

DELBERT E. GANTZ, Primary Examiner

J. M. NELSON, Assistant Examiner

U.S. Cl. X.R.

260—681.5